United States Patent

[11] 3,557,316

[72] Inventors Ryoichi Kimura; Chikai Ii; Kazuo Itoh; Eiroku Kondo, Yokohama, Japan

[21] Appl. No. 732,761
[22] Filed May 28, 1968
[45] Patented Jan. 19, 1971
[73] Assignee Hitachi, Ltd. Tokyo, Japan a corporation of Japan
[32] Priority June 2, 1967
[33] Japan
[31] No. 42/34839

[54] SYSTEM FOR PROVIDING ALTERNATIVE CONNECTIVE PATHS IN A COMMON CONTROL SWITCHING APPARATUS
6 Claims, 5 Drawing Figs.

[52] U.S. Cl. ........ 179/18
[51] Int. Cl. ........ H04q 3/42
[50] Field of Search ........ 179/18.211, 18.74, 18Reg, 22

[56] References Cited

UNITED STATES PATENTS

| | | | |
|---|---|---|---|
| 2,885,480 | 5/1959 | Oberman | 179/18(Reg) |
| 2,999,131 | 9/1961 | Edström | 179/18(.74) |
| 3,231,677 | 1/1966 | Edström et al. | 179/18(Reg) |

*Primary Examiner*—Kathleen H. Claffy
*Assistant Examiner*—Thomas W. Brown
*Attorney*—Craig, Antonelli, Stewart & Hill

ABSTRACT: A switching apparatus of the common control type having crossbar switches arranged in a plurality of connection stages and independent registers and senders. In the switching apparatus, alternative links which can connect any one of the originating registers with any one of subscriber terminals accommodated in the switching frame are provided in order to reduce the link congestion.

PATENTED JAN 19 1971 3,557,316

SHEET 1 OF 3

INVENTORS
RYOICHI KIMURA, CHIKAI II,
KAZUO ITOH, EIROKU KONDO

BY Craig & Antonelli

ATTORNEYS

INVENTORS
RYOICHI KIMURA, CHIKAI II,
KAZUO ITOH, EIROKU KONDO

BY Craig & Antonelli
ATTORNEYS

INVENTORS
RYOICHI KIMURA, CHIKAI II,
KAZUO ITOH, EIROKU KONDO

BY Craig & Antonelli
ATTORNEYS

SYSTEM FOR PROVIDING ALTERNATIVE CONNECTIVE PATHS IN A COMMON CONTROL SWITCHING APPARATUS

This invention relates to crossbar telephone systems and more particularly to a connection system in a crossbar switching apparatus of the common control type.

As is commonly known, it is preferable for a large-capacity local switching apparatus of the crossbar type to employ such an arrangement that crossbar switches are disposed in a plurality of connection stages, for example, three or four stages and are placed under full control in accordance with the common control system in order that such an apparatus can be operated economically and can possess the desired degree of versatility to deal with various additional services that may be required from the apparatus. Furthermore, with such a large-capacity local switching apparatus of the crossbar type comprising crossbar switches arranged in a plurality of stages and operating under full control by a common control circuit, it is known that the system in which registers and senders are separately provided as independent units and one of the senders is operated only when selecting information must be sent out to a distant switching apparatus is economically advantageous over the system in which the registers and the senders are combined together as integral units. Because of the above advantage, most local switching apparatus of the crossbar type presently in use employ the former system, that is, the system in which the crossbar switches are arranged in a plurality of connection stages and placed under full common control and the registers and the senders are separately provided as independent units.

It is a primary object of the present invention to provide improvements in a crossbar switching apparatus of the kind which is adapted to operate with such a system.

The above and other objects, advantages and features of the present invention will be apparent from the following description with reference to the accompanying drawings, in which.

Figure 1:
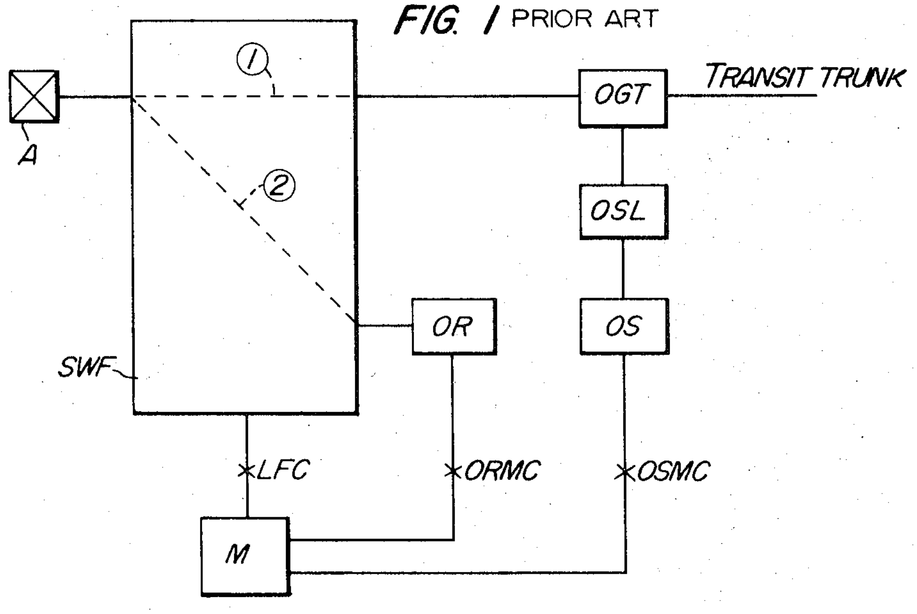
FIG. 1 PRIOR ART
FIG. 1 is a block diagram of a known switching apparatus which is adapted to receive and send out information by a sender.

Briefly speaking, a crossbar switching system shown in FIG. 1 comprises, a switching frame SWF which consists of crossbar switches arranged in a plurality of connection stages, a subscriber telephone set A accommodated in one side of the switching frame SWF, an originating register OR and outgoing trunk OGT accommodated in another side of the switching frame SWF, an originating sender OS, an originating sender link OSL which connects the outgoing trunk OGT and the originating sender OS, and a marker M which controls all kinds of operations of this switching system through various kinds of connectors LFC, ORMC and OSMC. Because of simplicity, only one is shown for every kind of apparatus, but there is a plurality of apparatus for every kind of apparatus. The switching system operates in the following manner in response to an originating call, especially a call requiring an outgoing connection. When a calling subscriber raises his handset, the line to which the calling subscriber belongs is first connected with an originating register. The originating register sends out a dial tone to the calling subscriber, and upon hearing the dial tone, the calling subscriber starts dialing. All the digits of the selecting information thus dialed are stored temporarily in the originating register. Upon complete reception of all the digits of the selecting information, the originating register starts a marker and transfers the received selecting information to the marker, requesting the marker to make the necessary connection. The marker starts a translator which converts the selecting information sent out from the originating register into information of the form required to effect the desired connecting operation. When this call is an outgoing call, the marker selects and seizes a suitable, idle and available outgoing trunk and thus connects the calling subscriber with the seized outgoing trunk. At the same time, the marker selects an idle and available outgoing sender and thus connects the seized outgoing trunk with the selected outgoing sender. In the meantime, the connection between the calling subscriber and the originating register is released. The selecting information to be sent out to a distant switching apparatus is transferred from the originating register to the outgoing sender through the marker and is then sent from the outgoing sender to the distant switching apparatus by way of the outgoing trunk. Upon sending out all the selecting information to be transmitted to the distant switching apparatus, the outgoing sender releases itself to maintain the connection between the calling subscriber and the outgoing trunk.

However, the system of the above type is defective in that a considerably long delay time is inevitably required for the connection before a ringing tone or audible ringing signal is issued after the completion of dialing by a calling subscriber, that is, the so-called post-dialing delay is quite considerable. This is because the selection of an outgoing line, establishment of a talking path and transmittal of dial pulses to a distant switching apparatus are started after dialing all the digits of information by the calling subscriber and complete reception of all the information by an originating register, and only after all the above steps, the distant switching apparatus starts its operation.

FIG. 1 is a block diagram of the known system referred to above. Suppose now that a local office shown in FIG. 1 has a local office number "2," and a calling subscriber A belonging to this office originates a call to request a connection with a subscriber B (not shown) in another local office. Suppose further that this other local office has a local office number "3" and the called subscriber B has a subscriber's number "4567." Thus, the subscriber A dials "34567" in calling for a connection with the subscriber B. When the calling subscriber A raises his handset, the calling subscriber A is first connected with an originating register OR by way of a link in a route ② of a switching frame SWF, and a dial tone is sent to the calling subscriber A from the originating register OR. Then when the calling subscriber A dials the first digit "3,"the originating register OR receives the digit "3" and judges that an outgoing connection must be made or that the digit differs from the office number of its own local office. The originating register OR starts a marker M while standing ready for the reception of dial pulses of the second and succeeding digits. The marker M, which is informed by the originating register OR that the first digit is "3," selects and idle and available outgoing line leading to the local office having the office number "3" and seizes an outgoing trunk OGT on the selected outgoing line thereby to connect the calling subscriber A with the seized outgoing trunk OGT by way of a link in a route ①. In the meantime, the marker M selects one of the idle and available outgoing senders OS and connects the selected outgoing trunk OGT with the outgoing sender OS by way of an outgoing sender link OSL. If there is no idle and available link in the route ①, the call is blocked.

The outgoing sender OS is provided with both the function of receiving dial pulses and the function of sending out dial pulses and can thus simultaneously receive and send out the dial pulses. In other words, the outgoing sender OS can receive the number dialed by the calling subscriber A by way of the outgoing trunk OGT and the outgoing sender link OSL, and at the same time, can send out the dial pulses to the distant switching apparatus by way of the outgoing sender link OSL and the outgoing trunk OGT. Upon completion of the connection between the calling subscriber A and the outgoing trunk OGT and the connection between the outgoing trunk OGT and the outgoing sender OS, that part of the dialed information already received by the originating register OR which must be sent to the distant switching apparatus is transferred from the originating register OR to the outgoing sender OS by way of an originating register marker connector ORMC, the marker M and an outgoing sender marker connector OSMC. The above transfer operation is effected instantaneously since the information is transferred in the form of a DC signal coded in accordance with the 2 out of 5 code or the like. The originating register OR and the link in the route ② are then released. Any dialed signal issued thereafter is received by the receiver section of the outgoing sender OS instead of the originating register OR. The outgoing sender OS, while receiving the dialed signal by its receiver section, sends out at the same time the dialed signal from its transmitter section to the distant switching apparatus. Accordingly, the delay in connection time attributable to the switching operation of the switching apparatus can be reduced approximately to a period of the order of one impulse train which is at least required until the last digit is sent out after reception of such a digit. However, in the system of dialed information reception and transmittal by the sender described above, one link in the route ① is selected to connect the calling number subscriber A with the outgoing trunk OGT in the state in which one link in the route ② connecting the calling subscriber A and the originating register OR has been seized. This means that the number of selectable primary links in this system is one less than that in the first-mentioned system which is adapted to make the necessary connecting operation after reception of all the FIGS. of a dialed number, resulting in an increase in link congestion or a decrease in the traffic that can be carried by the switching frame. Thus, the system of dialed information reception and transmittal by the sender has been inferior in respect of economy to the system which is adapted to make the necessary connecting operation after reception of all the figures of a dialed number.

In a crossbar switching apparatus of the multistage connection type commonly widely employed, the number of primary links connectable with one subscriber terminal is generally in the order of five to 10. Suppose that the number of primary links in such a switching apparatus is eight, for example. Then, subtraction of one primary link from the eight primary links would approximately double the link congestion provided that the traffic applied to the apparatus remains the same.

With such a defect of the prior art in view, the present invention proposes a method which can avoid the undesirable increase in link congestion resulting from the decrease in the number of selectable primary links due to the double connection described above.

Figure 2:
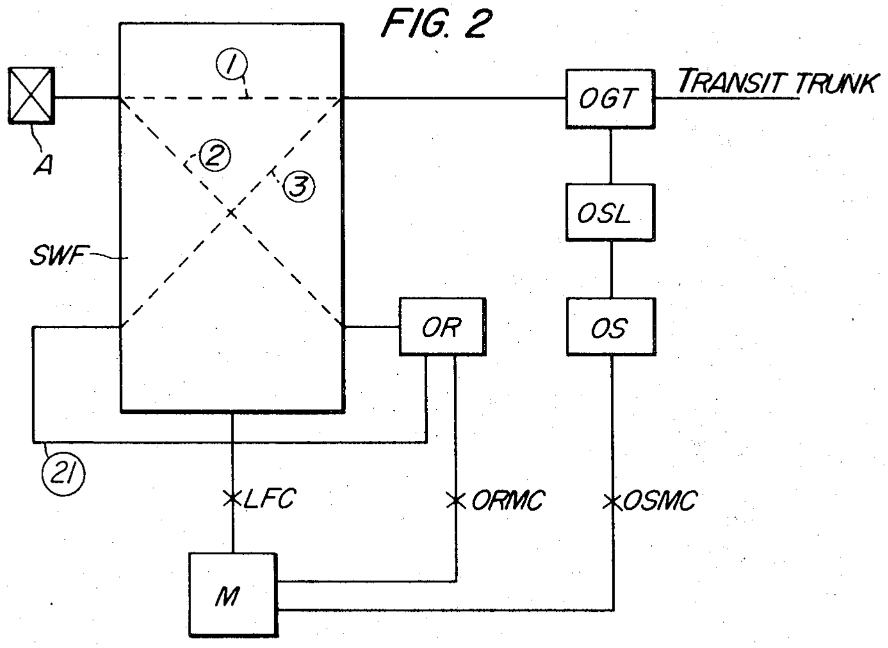
FIG. 2 is a block diagram illustrating an embodiment of the present invention.

A block diagram of an embodiment of the present invention is shown in FIG. 2. The system embodying the present invention is featured by the provision of alternative route ③ as shown in FIG. 2 and operates in a manner substantially similar to the operation described with reference to FIG. 1. According to the known system of information reception and transmittal by a sender in the manner described hereinbefore, a call originating from a calling number subscriber A is blocked when there is no idle and available link in a route ① for establishing a connection between the calling subscriber A and an outgoing trunk OGT, but according to the system of the present invention, the desired connection between the calling subscriber A and the outgoing trunk OGT can be set up by way of a link in a route ③ and one of the alternative links ㉑. Because of the fact that there is a link in the route ③, the calling subscriber A can be connected with the outgoing trunk OGT by the combination of the links in the route ②–㉑–③.

Needless to say, when there is an idle and available link in the route ①, the calling subscriber A can be connected with the outgoing trunk OGT by way of the link in the route ① in the manner described hereinbefore. Thus, it will be understood that the link in the route ③ can also be used for setting up the connection between the subscriber A and the outgoing trunk OGT in addition to the normal path by way of the link in the route ①, and that the link selection range becomes much wider than in the case of the system which is adapted to send out information after storing all the figures of such information, and thereby the link congestion can be reduced remarkably. Since the link in the route ③ is actually used only when there is no idle and available link in the route ①, there is very little opportunity of actually using the link in the route ③ and an insignificant increase in traffic would only be imposed on the switching frame for establishing the connection by way of the route ②–㉑–③. Furthermore, an originating register OR would also be subject to an insignificant increase in traffic since the rate of extra holding of the originating register in such a case would also be quite negligible.

Figure 3:
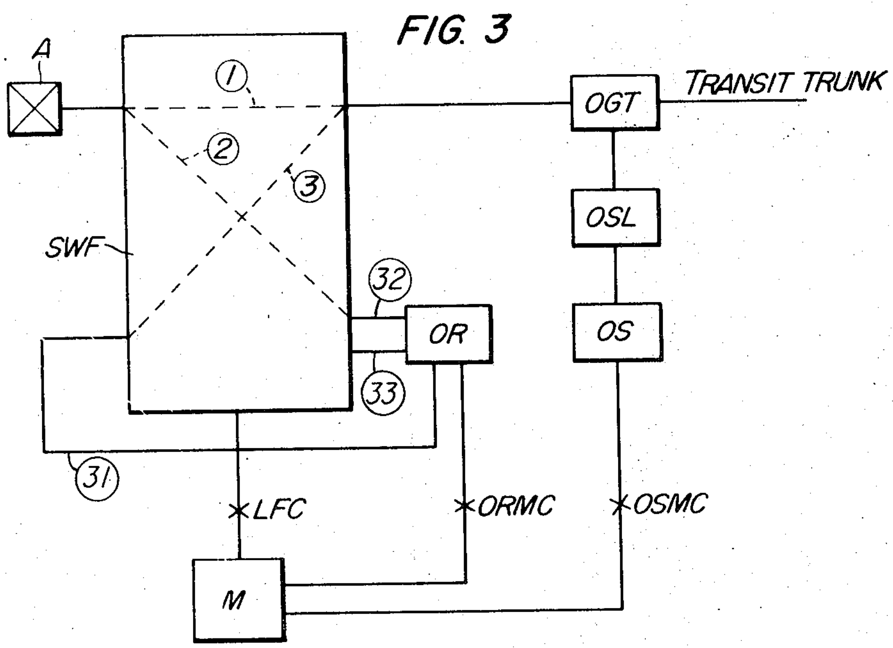
FIG. 3 is a block diagram illustrating another embodiment of the present invention.

In another embodiment shown in FIG. 3, at least two links ㉜ and ㉝ are provided for each originating register OR so as to ensure an unfailing connection between a switching frame SWF and the originating registers OR. According to this arrangement, when a call is originating from a subscriber A and while the calling subscriber A is connected through, for example, the link ㉜ and the associated originating register OR with an outgoing trunk OGT by way of a link in a route ② - link ㉜ - originating register OR - alternative link ㉛ - link in a route ③, the other link ㉝ of the originating register OR is left in an idle and available state to stand by for servicing another call. More precisely, after the connection path connecting the calling subscriber A with the outgoing trunk OGT by way of the route A - ② - ㉜–OR–㉛–③ - OGT has been completed and an outgoing sender OS has started to receive the dial pulses, another call can be serviced through the other link ㉝, because the line ㉜ is directly connected with the alternative link ㉛ through the associated internal mechanism of the originating register OR, while various functions, including the function of dialed information reception, etc., of the associated internal mechanism of the originating register OR, are available.

Figure 4:
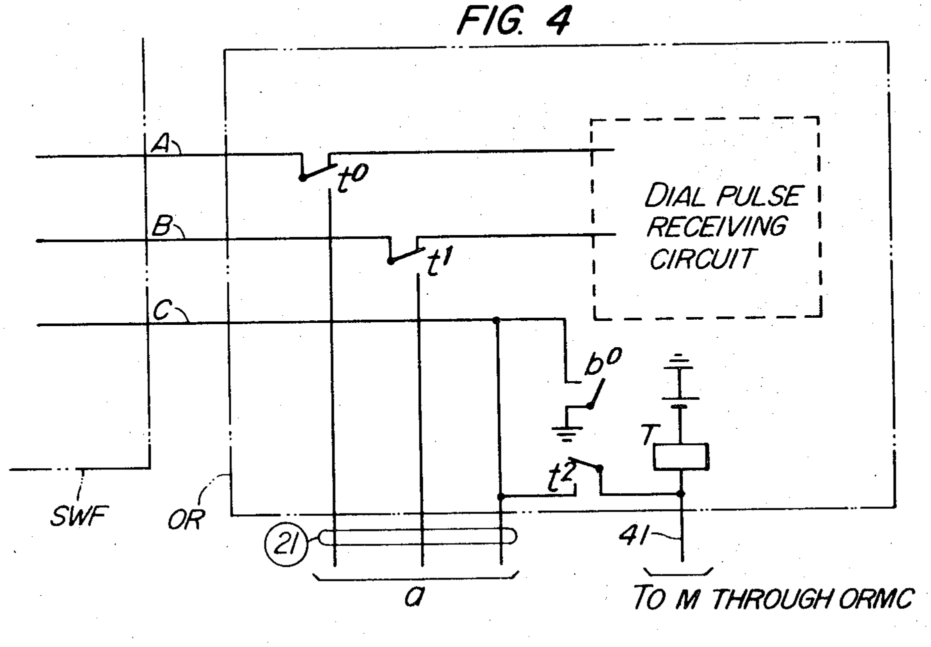
FIG. 4 is a circuit diagram illustrating the structure of an originating register shown in FIG. 2.

FIG. 4 is a circuit diagram of part of the originating register OR shown in the block diagram of FIG. 2 and illustrates that part of the originating register OR which relates to the present invention. The originating register OR comprises a relay T which is energized by a ground potential or like signal supplied to a lead wire 41 from the marker M in connection with the case in which the alternative link ㉑ is used in the manner described with reference to FIG. 2. The relay T has a plurality of contacts $t^0$ to $t^2$. A contact $b^0$ of a relay B (not shown) in the originating register OR, which remains in its energized state while the originating register OR is in operation, supplies ground potential to a lead wire C thereby to keep the crossbar switches (not shown) of the switching frame SWF in their operating state. The marker M, when it fails to seize an idle and available link in the route ① in FIG. 2 which serves primarily as connection path between the calling subscriber A and an outgoing trunk OGT, starts automatically to select an idle and available link in the route ③ and connects the link in the route ③ with the outgoing trunk OGT if it succeeds in selecting such a link. At the same time, the marker M connects the outgoing trunk OGT with an outgoing sender OS by way of an outgoing sender link OSL. As soon as the outgoing sender OS is ready to receive dial pulses sent from the subscriber, the marker M supplies a ground potential signal to the originating register OR by way of an originating register marker connector ORMC and a lead wire 41 thereby to energize the relay T disposed within the originating register OR. The relay T holds itself at its contact $t^2$ due to the fact that the ground potential is supplied through the contact $b^0$. Thus the relay T is kept energized so long as the originating register OR is in operation even after the marker M and the originating register marker connector ORMC have been released.

Figure 5:
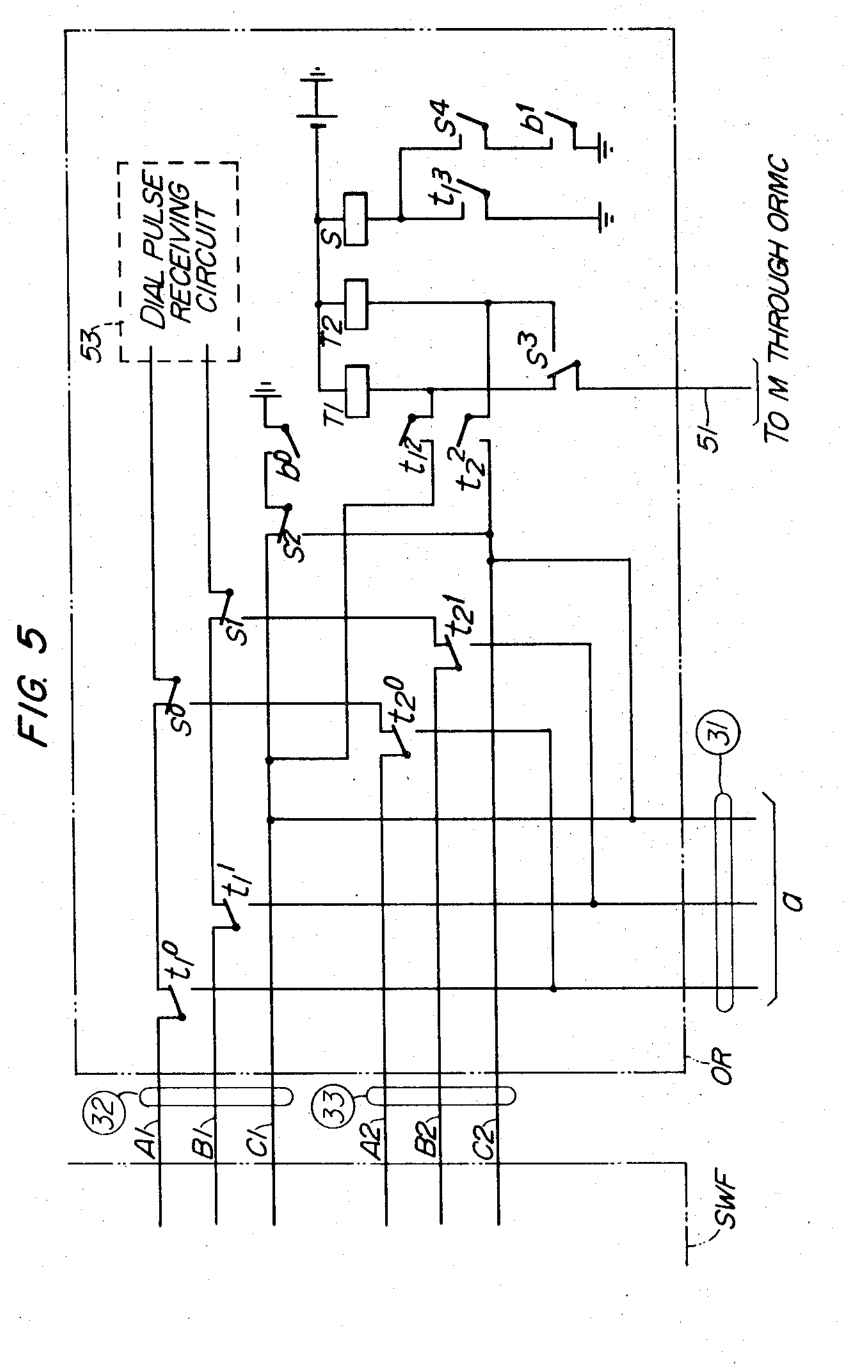
FIG. 5 is a circuit diagram illustrating the structure of an originating register shown in FIG. 3.

FIG. 5 is a circuit diagram of part of the originating register OR seen in the block diagram of FIG. 3 and illustrates the same part as that appearing in FIG. 4. The originating register OR comprises relays T1 and T2 which are energized by a lead wire 51 under the command of the marker M in connection with the case in which the alternative link ㉛ is used in the manner described with reference to FIG. .3. The relays T1 and T2 have a plurality of contacts $t^0{}_1$ to $t_1{}^3$ and $t^0{}_2$ to $t_2{}^2$, respectively. A relay S having a plurality of contacts $s^0$ to $s^4$ is provided in order to switch over the operation so that the link ㉝ can be used when the link ㉜ of the originating register OR is held by a call using the alternative link ㉛ . A relay B (not shown) having a plurality of contacts $b^0$ to $b^1$ remains in its energized state so long as the dial pulse receiving circuit and the like of the originating register OR are in operation. Normally, the originating register OR is operated through the link ㉜ which connects the originating register OR with the switching frame SWF by way of lead wires A1, B1 and C1. When it becomes necessary to switch over the route for the call being handled by the originating register OR to a route by way of the alternative link ㉛ , the relay T1 is energized by a ground potential signal supplied through a lead wire 51 from the marker M, and its contact $t_1{}^0$ and $t_1{}^1$ connects the link ㉜ , or lead wires A1, B1 and C1, directly with the alternative link ㉛ . At the same time, the relay S is energized by the closure of the contact $t_1{}^3$ of the relay T1 to connect the link ㉝ with the dial pulse receiving circuit 53 so that this originating register OR is now available for handling another call. Any description as to the dial receiving circuit 53 and other conventionally functioning circuits of the originating register will not be given herein as they have no direct relation to the present invention and are well known to those skilled in the art of telephone exchanges.

It will be appreciated from the foregoing description that the present invention can realize a useful system which does not impair in any way the excellent features of the crossbar switching apparatus of the type comprising crossbar switches arranged in a plurality of connection stages and placed under full control by a common control circuit and registers and senders separately provided as independent units, said features including: (1) capability of a large-scale switching operation; (2) capability of using transit trunks with high efficiency by arranging outgoing lines as a full availability group; (3) a large number of selectable routes including alternative routes; (4) capability of employing a multifrequency code in transmitting information between offices; and (5) high versatility in regard to accommodation of additional special services. In addition to the above advantage, the system according to the present invention is advantageous in that it retains the desired degree of economy and obviates an undesirable delay in connection time. In practical use, separate alternative links need not be provided for respective originating registers OR and suitable alternative links may be connected in multiple with a plurality of originating registers in order to reduce the number of alternative links. Such an arrangement can easily be derived as a useful modification of the present invention.

It is also apparent that the system according to the present invention can be applied to a switching apparatus of the common control type having a combined register and sender in place of the illustrated switching apparatus having an independent register and sender, and when used in such an apparatus, the present invention can likewise reduce link congestion.

We claim:

1. A switching system comprising switching frames which have a first set of links connected to the subscribers' telephone sets on one side thereof, originating registers and outgoing trunks both connected to a second set of links on another side of said switching frames, originating senders, originating sender links which connect said outgoing trunks to said originating senders, and markers which control operations of said switching system, characterized in that said system further comprises alternative switching links connecting said originating registers to said one side of said switching frames.

2. A common control telephone switching system comprising:

a switching frame for providing a plurality of possible connection paths between opposite sides thereof, whereby a subscriber line may be connected over any one of said plurality of paths from one side of said switching frame to the opposite side thereof; and an originating register connected to said switching frame on the side opposite to which a subscriber line may be connected, said originating register comprising means for producing a further connection path from said opposite side of said switching frame to said one side of said switching frame to which said subscriber line may be connected.

3. A telephone switching system according to claim 2, wherein said switching frame is provided with a plurality of connecting links on each side thereof, to separate ones of which said originating register and said subscriber line are connected.

4. A telephone switching system according to claim 3, wherein said means for providing said said further connection path comprises a plurality of alternate connecting links, whereby said further connection path between said opposite side of said switching frame and said one side of said switching frame, to which said subscriber may be connected, may be provided over any one of said plurality of alternate connecting links.

5. A telephone switching system according to claim 4, wherein said originating register further includes means, responsive to the absence of an idle connection path through said switching frame from a subscriber line to a free connecting link on the opposite side of said switching frame, for selecting one of said further connection paths, whereby a connection path will be provided between said subscriber line to a free connecting link on said opposite side of said switching frame.

6. A telephone switching system according to claim 5, wherein said system further includes an outgoing trunk, an originating sender, an originating sender link connecting said outgoing trunk to said originating sender and a marker, connected to said originating sender, said switching frame and said originating register, for controlling the operations of said system and wherein said outgoing trunk is further connected to said free connecting link on the opposite side of said switching frame, whereby said subscriber line may be connected through said outgoing trunk to a called party.